(12) United States Patent
Shinada

(10) Patent No.: US 7,283,041 B2
(45) Date of Patent: Oct. 16, 2007

(54) SIDE MIRROR DEVICE FOR VEHICLE

(75) Inventor: Akira Shinada, Tokyo (JP)

(73) Assignee: Sony Corporation, Tokyo (JP)

( * ) Notice: Subject to any disclaimer, the term of this patent is extended or adjusted under 35 U.S.C. 154(b) by 101 days.

(21) Appl. No.: 10/509,330

(22) PCT Filed: Apr. 25, 2003

(86) PCT No.: PCT/JP03/05367

§ 371 (c)(1),
(2), (4) Date: Oct. 7, 2004

(87) PCT Pub. No.: WO03/091071

PCT Pub. Date: Nov. 6, 2003

(65) Prior Publication Data

US 2005/0146604 A1 Jul. 7, 2005

(30) Foreign Application Priority Data

Apr. 26, 2002 (JP) ............................. 2002-127426

(51) Int. Cl.
- *B60Q 1/00* (2006.01)
- *G02B 5/08* (2006.01)
- *G02B 7/18* (2006.01)
- *G06F 17/10* (2006.01)
- *G06G 7/78* (2006.01)

(52) U.S. Cl. ...................... 340/435; 359/843; 701/301

(58) Field of Classification Search ........ 340/435–437, 340/686.1, 693.5, 815.73–815.77, 999; 359/839, 359/548, 843, 844, 872–877; 701/300–301
See application file for complete search history.

(56) References Cited

U.S. PATENT DOCUMENTS 6,693,519 B2 * 2/2004 Keirstead .................... 340/435

2002/0005778 A1 * 1/2002 Breed et al. ................ 340/435

FOREIGN PATENT DOCUMENTS

| EP | 1 321 334 A2 | 6/2003 |
|---|---|---|
| GB | 2 327 823 | 2/1999 |
| JP | 7-274161 | 10/1995 |
| JP | 9-142213 | 6/1997 |
| JP | 9-142213 A * | 6/1997 |
| JP | 10-97691 | 4/1998 |
| JP | 11-139252 | 5/1999 |
| JP | 2000-108786 | 4/2000 |
| JP | 2000-108786 A * | 4/2000 |
| JP | 2000-177513 | 6/2000 |
| JP | 2001-130324 | 5/2001 |
| JP | 2001-130324 A * | 5/2001 |
| JP | 3080205 | 6/2001 |
| JP | 2002-046579 | 2/2002 |
| JP | 2002-53080 | 2/2002 |
| JP | 2002-104252 | 4/2002 |
| JP | 2003-125396 | 4/2003 |
| JP | 2003-125396 A * | 4/2003 |

OTHER PUBLICATIONS

Patent Abstracts of Japan, JP 2001-130324, May 15, 2001.
Patent Abstracts of Japan, JP 10-097691, Apr. 14, 1998.
Patent Abstracts of Japan, JP 2000-108786, Apr. 18, 2000.
Patent Abstracts of Japan, JP 09-142213, Jun. 3, 1997.

* cited by examiner

*Primary Examiner*—Benjamin C. Lee
*Assistant Examiner*—Jennifer Mehmood
(74) *Attorney, Agent, or Firm*—Oblon, Spivak, McClelland, Maier & Neustadt, P.C.

(57) ABSTRACT

A side mirror apparatus for an automobile to obtain a field of view to the rear when the side mirror apparatus is drawn out to a drawn out position and to be stored when not in use, specifically capable to confirm the field of view to the rear when the side mirror apparatus is stored.

10 Claims, 8 Drawing Sheets

SIDE MIRROR DEVICE FOR VEHICLE

TECHNICAL FIELD

The present invention relates to a side-mirror apparatus for automobile, and particularly relates to a side-mirror apparatus for automobile capable of being drawn out to a drawn-out position to obtain a field of view to the rear, and being stored when not in use.

BACKGROUND ART

Door mirrors fitted to the door of an automobile and fender mirrors fitted to the front fender are well-known as a side-mirror apparatus. For example, in Japanese Laid-open patent publication No. Hei. 5-301541, a door mirror is disclosed where an outer casing of a door mirror fitted to an automobile door is fitted with an electronic camera on an outside surface of the outer casing of the door mirror, and an image is displayed by a display provided in the vicinity of the driver's seat. With these door mirrors, automobile safety is improved because it is possible to display images obtained by the electronic camera using a display apparatus to the front of the driver's seat, it is possible to output an alarm signal using an alarm when the distance to obstacles such as oncoming automobiles etc. becomes close, and it is possible for the driver to easily recognize conditions to the front of neighboring lanes displayed at a console etc. provided in the vicinity of the driver's seat.

The door mirror disclosed in Japanese patent laid-open publication no. Hei. 5-301541 has the drawback that, although it is possible to obtain a field of view to the front with the door mirror in a drawn-out position, it is not possible to obtain a field of view to the side and rear.

On the other hand, it is necessary to store the door mirror when passing through narrow lanes or passing obstacles such as telegraph poles and stationary automobiles. On the other hand, when the door mirror is stored, a field of view to the rear can no longer be obtained using the door mirror, and it is necessary to travel without being able to confirm to the rear using the door mirror. Moreover, when the door mirror is stored and it is intended to open the door and go to outside of the automobile, it is not possible to identify automobiles and people to the rear using the door mirror because the door mirror is already housed, which may be detrimental to the degree of safety.

As the present invention sets out to resolve the aforementioned problems, it is an advantage of the present invention to provide a side-mirror apparatus for automobile capable of obtaining a field of view to the rear even when the side mirror constituted by a door mirror is stored, to enable reliable identification to the rear of the automobile when the side mirror is stored and it is wished to go to outside of the automobile, and to enable observation of the inside and outside of the automobile utilizing a side mirror.

DISCLOSURE OF THE INVENTION

The principal parts of the invention of the present application relate to a side-mirror apparatus for automobile characterized by a side-mirror apparatus for automobile drawn out to a drawn-out position in the event of use and stored when not in use, provided, at an outer casing of the side mirror apparatus, with imaging means for obtaining a field of view in a direction substantially orthogonal to the field of the side mirror apparatus.

An electronic camera fitted to substantially the end portion of the outer casing so that an image captured by the electronic camera is displayed by display means inside the automobile is preferable as this imaging means. It is also preferable for an image to be captured by the imaging means using a command signal from operation means so that the image is displayed inside the automobile using display means. It is also preferable for a field of view to the side of the automobile to be obtained using the imaging means in the event that the side mirror device is in a drawn out position and for a field of view to the rear to be obtained using the imaging means in the event that the side-mirror apparatus is in a stored position. It is also preferable for the imaging means to capture the field of view to the rear for display inside the automobile using the display means in the event that the start of an operation for opening a door is detected when the side-mirror apparatus is in a stored position.

Further, it is also preferable for the imaging means to capture an image of inside and outside of the automobile and send the image to a monitor apparatus at a remote position via communication means. It is also preferable for the imaging means to capture images of the inside of the automobile and send the image to a monitor apparatus at a remote position via communication means in the event that the side-mirror apparatus is in a stored position. It is further possible to provide a sensor for detecting an abnormality of the automobile so that the imaging means captures an image in conjunction with the sensor detection, with the image captured then being transmitted by transmission means. It is also preferable for the imaging means to capture images in response to a monitoring command signal sent from outside so that the image captured is sent by the transmission means.

Further principal parts of the present invention of this application relate to a side-mirror apparatus for automobile characterized by a side-mirror apparatus for automobile drawn out to a drawn-out position in the event of use and stored when not in use, provided with a first mirror for obtaining a field of view to the rear of the automobile when in use, and a second mirror provided substantially at an end portion at the outer casing of the side-mirror apparatus.

The second mirror may also obtain the field of view to the rear when the side-mirror apparatus is in the stored position. Further, the second mirror is preferably a convex mirror.

In a preferred mode of the present invention contained in this application, a side-mirror apparatus with an electronic camera employing an imaging element such as a CCD (Charge Coupled Device) etc. installed at a side mirror outer casing is provided with the electronic camera at an end portion of the outer casing, with the optical axis of the electronic camera being in a direction substantially orthogonal with respect to the optical axis of this side mirror. According to this side-mirror apparatus, in the event that the door is opened with the side mirror in a stored state, it is possible to project images captured by the electronic camera at a display apparatus, it is possible to monitor the inside and outside of the automobile using the electronic camera when the side-mirror apparatus is stored and the automobile is locked, so as to construct a security system as a result.

According to this side-mirror apparatus for automobile, it is possible to increase the convenience of a houseable, moveable side mirror, and it is possible to use the side mirror for security purposes during night-time or when the vehicle is parked.

BEST MODE FOR CARRYING OUT THE INVENTION

Figure 1:
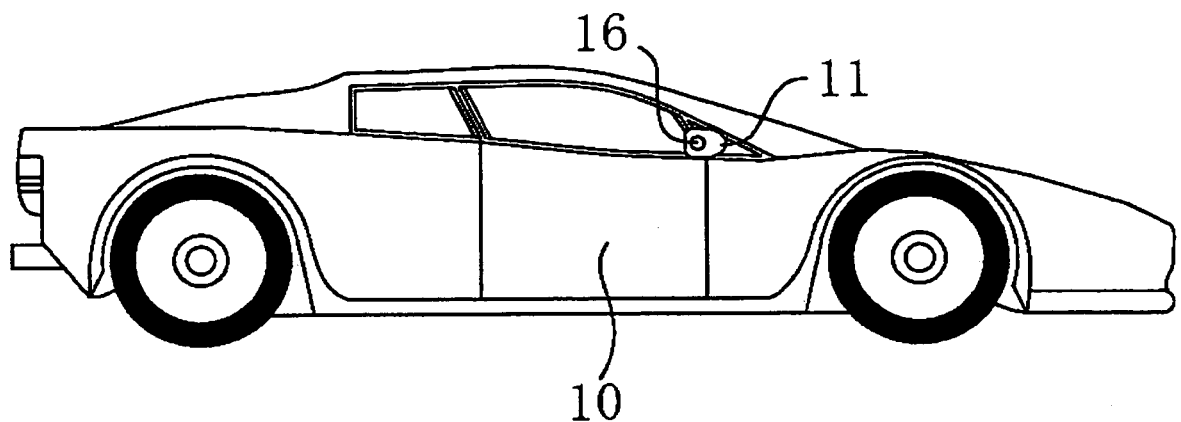
FIG. 1 is a side view of an automobile with a side mirror apparatus fitted.
Figure 3:
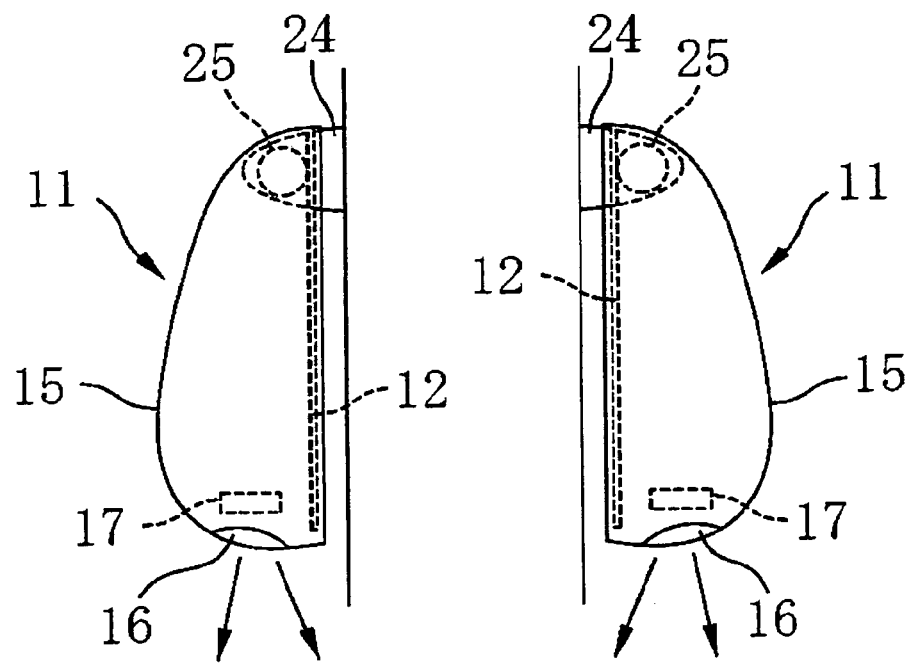
FIG. 3 is a plan view of a side mirror apparatus when stored.
Figure 4:
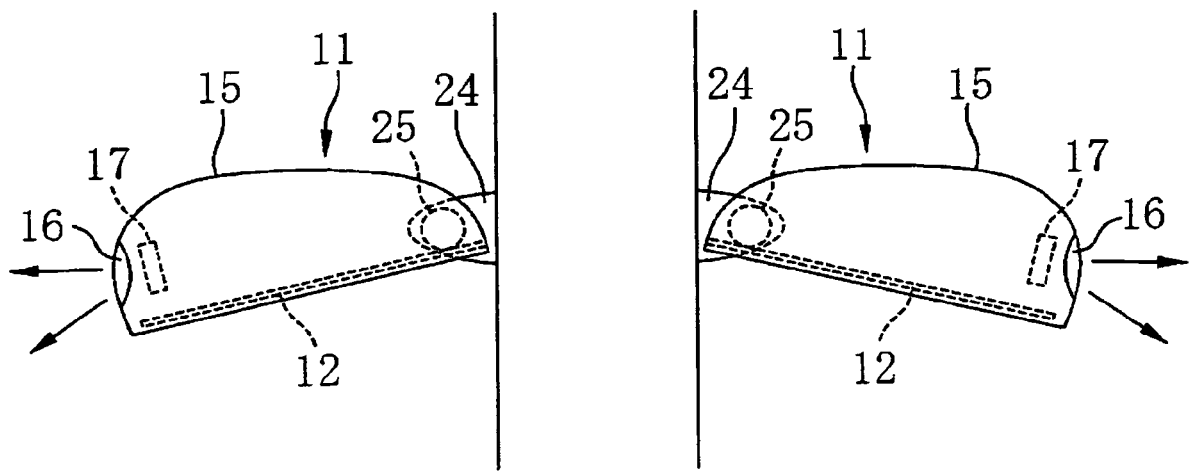
FIG. 4 is a plane view of a side mirror apparatus when drawn out.

The following is a description of the present invention using preferred embodiments shown in the drawings. FIG. 1 shows a vehicle equipped with a side-mirror apparatus for automobile of a preferred embodiment. A door mirror 11 constituting side-mirror apparatus is fitted at front end side parts of left and right doors 10 of the automobile. As shown in FIG. 3 and FIG. 4, the door mirror 11 is fitted with convex mirror 12 at an inside surface of outer casing 15, and is in drawn-out position during use, with a field of view to the rear being obtained by the convex mirror 12 as shown in FIG. 4.

Figure 2:
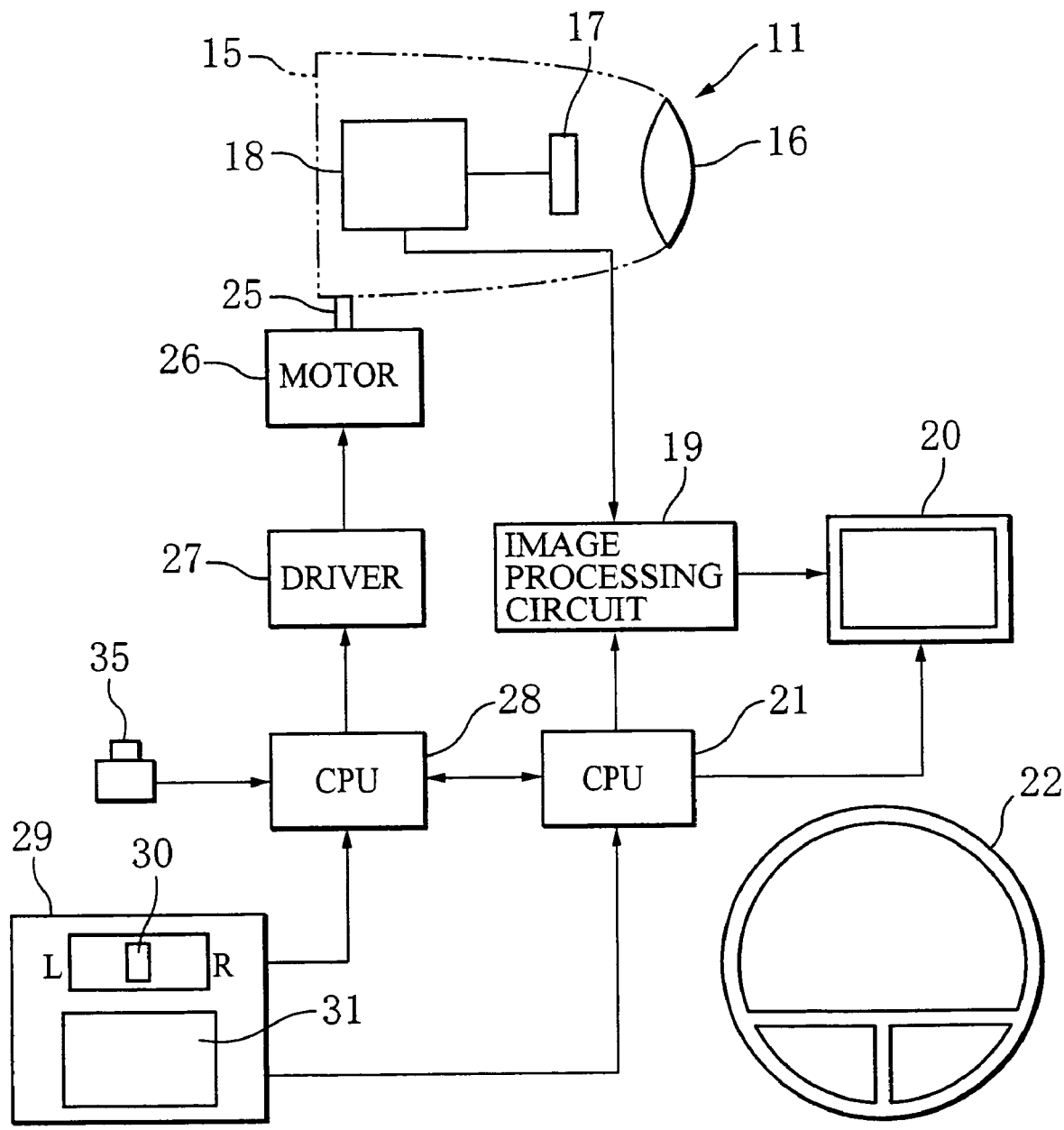
FIG. 2 is a block diagram illustrating a structure of a system of a side mirror apparatus.

Next, a description is given of imaging apparatus provided at the side-mirror apparatus 11 using FIG. 2. Convex lens 16 is fitted to the end portion of the outer casing 15 of the door mirror 11, and CCD 17 constituting imaging element is arranged to the rear of the convex lens 16 in such a manner as to coincide with the focal point position of the convex lens 16. The CCD 17 is connected to signal read-out circuit 18.

The signal read-out circuit 18 is further connected to an image processing circuit 19, with an image signal read out by the signal read-out circuit 18 being subjected to image processing by the image processing circuit 19. A display panel 20 is connected to the image processing circuit 19. The display panel 20 is provided diagonally in front of a steering wheel 22 and can be seen from a driver's seat. A CPU 21 is connected to the display panel 20 and the image processing circuit 19.

As shown in FIG. 3 and FIG. 4, the door mirror 11 constituting the side-mirror apparatus is supported in a moveable manner at a bracket 24 via a spindle 25. A motor 26 shown in FIG. 2 for causing the door mirror 11 to rotate interlock with the spindles 25. The motors 26 are made to turn due to command signals from the CPU (Central processing unit) 28 from the driver 27. The CPU 28 is connected to an operation panel 29. The operation panel 29 includes of a selection switch 30 for selecting the left and right door mirrors 11, and a drawing-out/storing changeover switch 31 for drawing-out/storing the selected door mirror 11. A door switch 35 is connected to the CPU 28 and detects the start of a door-opening operation.

Next, a description is given of the imaging operation by the imaging means provided at the door mirror 11. When the door mirror 11 is stored using the motors 26 by operation of the drawing-out/storing changeover switch 31 of the display panel 29 shown in FIG. 2, the state shown in FIG. 3 is attained. Namely, in this event, the convex mirror 12 of the door mirror 11 faces the doors and the field of view to the rear therefore cannot be obtained using the convex mirror 12.

The imaging element 17 then obtain the field of view to the rear via convex lens 16 fitted to the end portions of the outer casing 15 of the door mirror 11 so as to capture an image to the rear. These images are read out by the read-out circuit 18 shown in FIG. 2, subjected to image processing by the image processing circuit 19, and displayed on the display panel 20 to the front of the driver's seat. Namely, it is possible to project an image captured diagonally to the left and right of the door using the display panel 20 with the door mirror 11 stored as shown in FIG. 3.

Next, in the event that the operation panel 29 is operated and the drawing-out/storing changeover switch 31 is changed over, the door mirror 11 is drawn out to drawn out positions by the motor 26. In this event, as shown in FIG. 4, it is possible to directly obtain a field of view to the rear using the convex mirror 12 at the front ends of the casing 15. At this time, the imaging element 17 at the end portion of the casing 15 captures an image for a field of view to the side. The image is then read out by the read-out circuit 18, subjected to image processing by the image processing circuit 19, and displayed by the display panel 20. The driver can therefore acquire a field of view directly to the rear using the door mirror 11, and can acquire a field of view to the side using the display panel 20.

The side-mirror apparatus 11 of this embodiment is provided with an electronic camera includes the convex lens 16, CCD 17 and read-out circuit 18 inside the outer casing 15. The read-out circuit 18 is then connected to the image processing circuit 19. The image processing circuit 19 is constructed from an image processing IC for generating image information such as NTSC (National Television System Committee), PAL (Phase Alternating Line), and RGB (Red/Green/Blue) etc. from a signal read out by the read-out circuit 18. An image processed by the IC (image processing circuit) 19 is sent to the display panel 20 and displayed.

Figure 5:
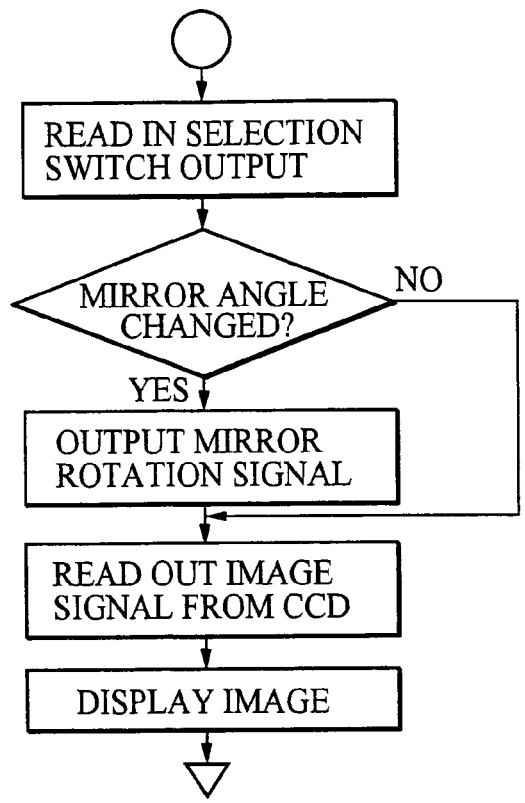
FIG. 5 is a flow chart for illustrating an operation of a system.

Next, a description is given of the operation of the imaging element system fitted to the door alarm 11 using FIG. 5. The CPU 21 or the CPU 28 reads in the output of the selection switches 30, 31 of the operation panel 29 and determines whether or not there have been changes in the rotation angle of the door mirror 11. The CPU 28 outputs a mirror rotation signal to a driver 27 in the event that the rotation angle of the door mirror 11 changes. As a result, the door mirror 11 is rotated by the motor 26. After this, an image is captured by the CCD 17, and the image is subjected to image processing by the image processing circuit 19 and is displayed at the display panel 20.

Figure 6:
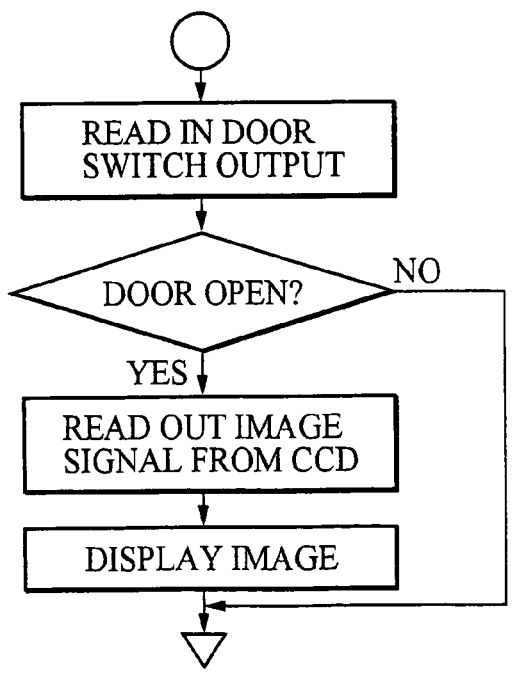
FIG. 6 is another flow chart for illustrating an operation of a system.

Next, the operation of a system for confirming the field of view to the rear by the imaging apparatus provided at the door mirror 11 when a door is opened is described using FIG. 6. In this operation, the CPU 28 reads in an output of a door switch 35. In the event that a door is detected to start to open by the door switch 35, the image signal from the CCD 17 is read out by a read-out circuit 18, is subjected to image processing by the image processing circuit 19, and is displayed on the display panel 20.

Therefore, when a driver opens the door to go outside of the automobile, it is possible to confirm a condition to the rear using the display panel 20 provided to the front of the driver's seat. It is therefore possible to get out of the automobile while reliably determining the condition to the rear even when the door mirror 11 is stored, so as to ensure a high degree of safety. It is also preferable for the image display operation to be such that the system is shut down after a prescribed amount of time has elapsed after the door is opened so as to turn off the image.

Figure 7:
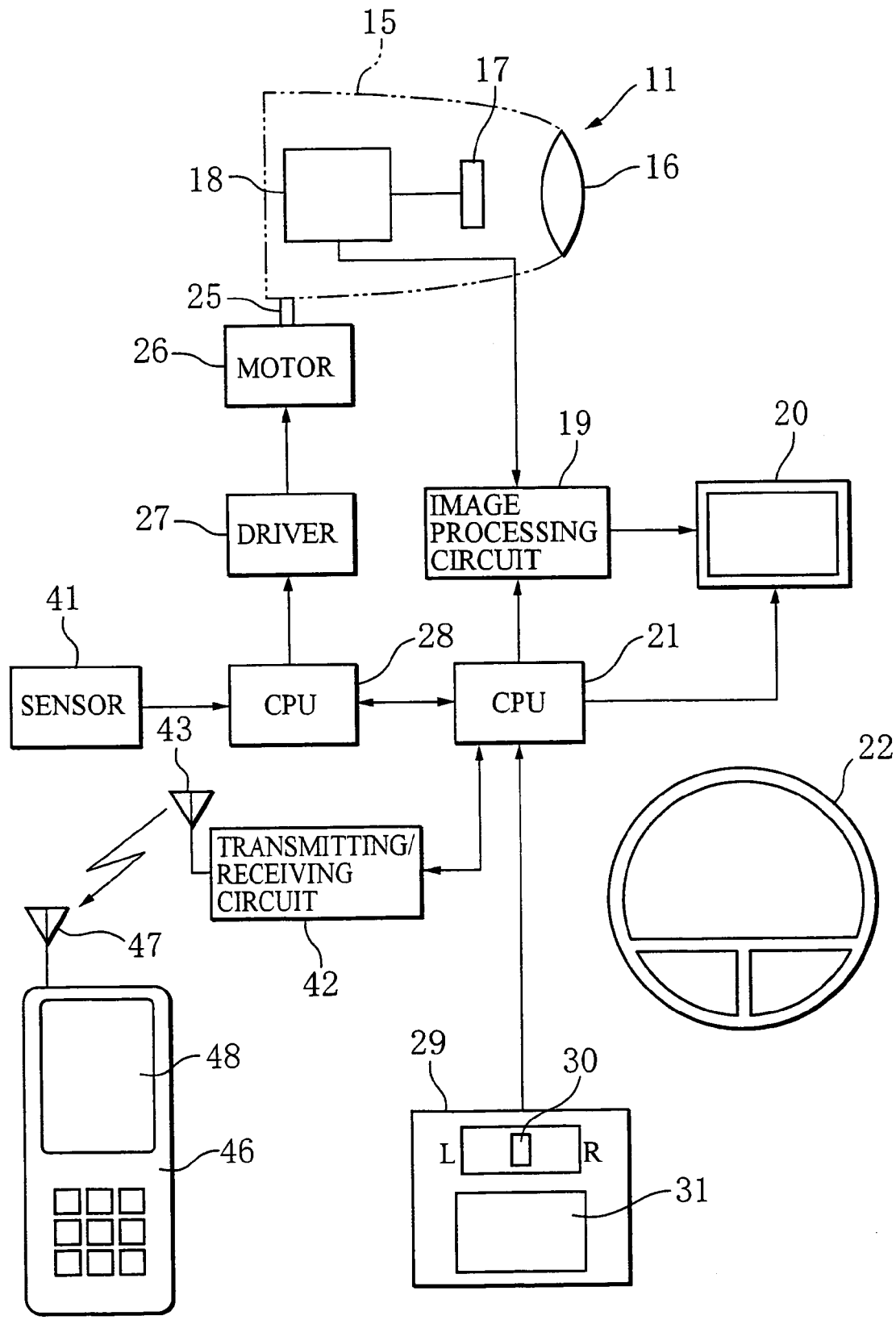
FIG. 7 is a block diagram illustrating a structure of a system of a side mirror apparatus of another embodiment.

Next, a description is given of a further embodiment using FIG. 7. In this embodiment, the imaging apparatus provided at the door mirror 11 is applied to a security system. A feature of this system is that an abnormality detection sensor 41 is connected to the CPU 28 as shown in FIG. 7. A transmitting/receiving circuit 42 is also connected to the CPU 21. This transmitting/receiving circuit 42 sends electromagnetic waves to an external mobile information terminal 46 via an antenna 43. The mobile information terminal 46 is equipped with an antenna 47, receives electromagnetic waves from the automobile, and displays an image using a display apparatus 48.

Figure 8:
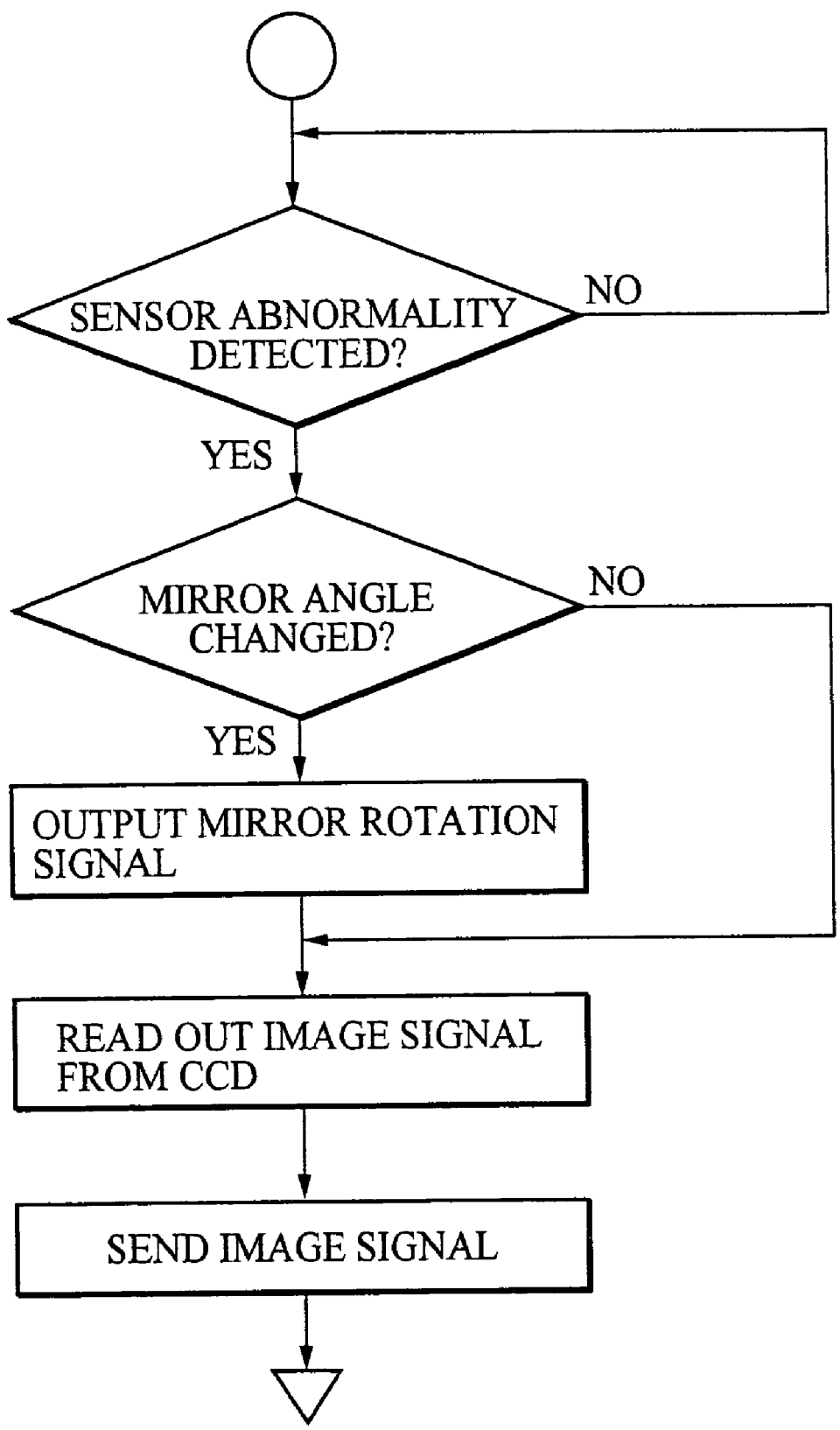
FIG. 8 is a flow chart for illustrating an operation of a system.

FIG. 8 shows a security operation employing the imaging apparatus of the door mirror 11. In the event that an abnormality is detected by the abnormality detection sensor 41, a determination is made as to whether or not changing of the angle of the door mirror 11 is necessary. When a change in the angle of rotation of the door mirror 11 is required, a signal is sent from the CPU 21 to the CPU 28 and a mirror rotation signal is outputted to the driver 27. As a result, the angle of rotation of the door mirrors 11 is changed by the motor 26. When change in the angle of the door mirror 11 is not required, the situation remains as is.

An image is then captured by the CCD 17 of the imaging apparatus provided at the door mirror 11, and the image is read out by the signal read-out circuits 18, subjected to image processing by the image processing circuit 19, and provided to the transmitting/receiving circuit 42 via the CPU 21. The transmitting/receiving circuit 42 therefore sends an image signal to the mobile information terminal 46 using the antenna 43. The mobile information terminal 46 receives an electromagnetic wave sent by the antenna 47 and displays an image using the display unit 48.

Therefore, in the event that some kind of abnormality occurs, it is possible to view images in this event using the display unit 48 of the mobile information terminal 46. Specifically, when the door mirror 11 is stored as shown in FIG. 3, it is possible to capture an image of the inside of automobile together with the field of view to the rear and send images captured in this manner to the mobile information terminal 46. For example, an acceleration sensor for detecting oscillation, a switch for detecting opening and closing of a door or window, or another type of abnormality detection sensor may be broadly applied as the abnormality detection sensor 41 for detecting an abnormality.

Figure 9:
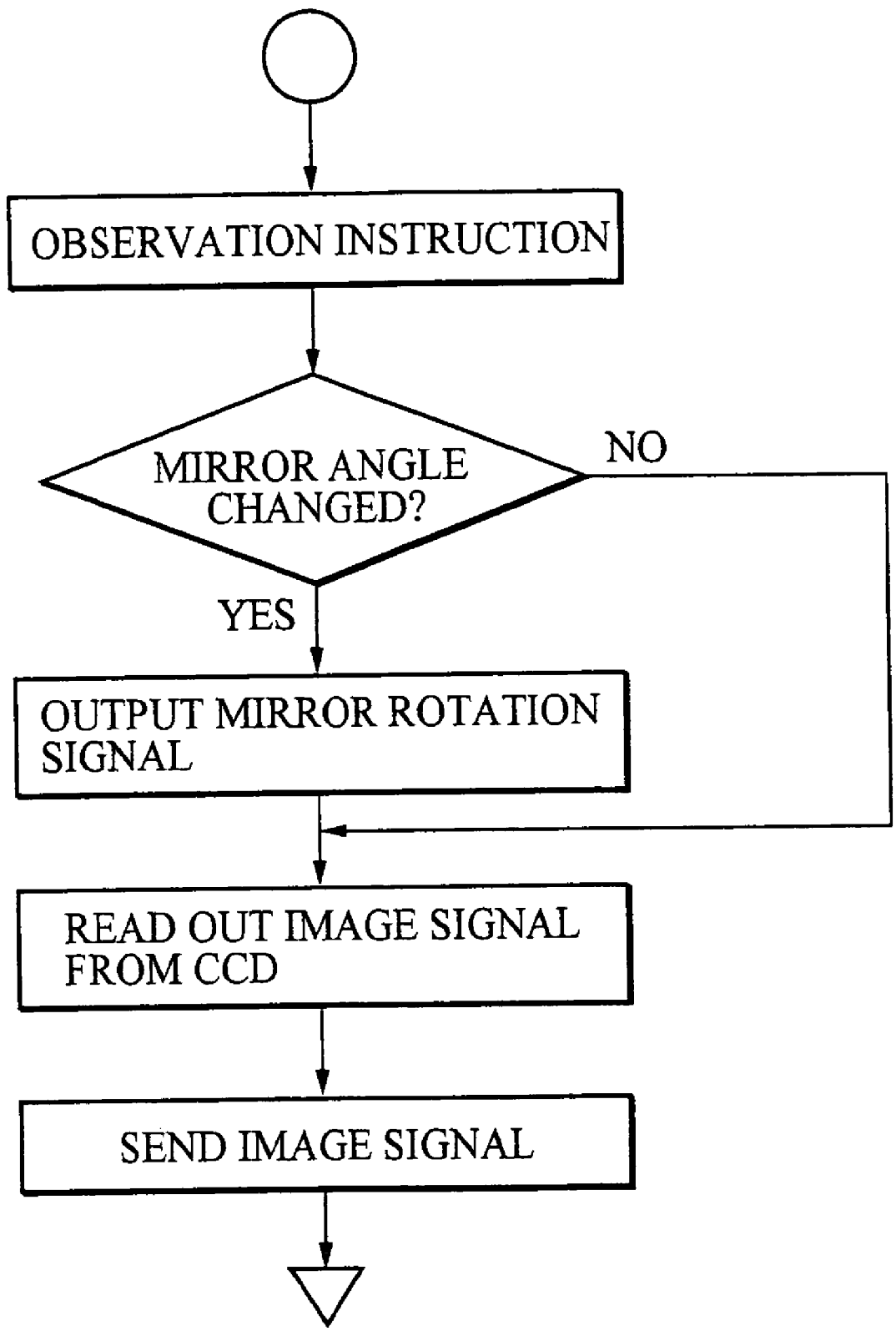
FIG. 9 is another flow chart for illustrating an operation of a system.

A monitoring system to which the imaging apparatus of the door mirror 11 may be applied is also capable of a monitoring operation based on a command from outside. Namely, when a signal is sent to the automobile by the mobile information terminal 46, the signal is received by the antenna 43 of the transmitting/receiving circuit 42. The CPU 21 therefore carries out a monitoring operation as shown in FIG. 9 based on the monitoring command.

In the event that the CPU 21 receives a monitoring command, the monitoring operation determines whether or not to change in the angle of rotation of the door mirror 11. In the event that it is necessary to change the angle, a rotation signal is outputted to the driver 27 via the CPU 28 and the door mirror 11 is made to rotate. In the event that rotation of the door mirror 11 is not necessary, this operation is omitted. After this, images captured by the CCD 17 is read out by the signal read-out circuit 18, subjected to image processing by the image processing circuit 19, and an image signal is provided to the transmitting/receiving circuit 42 via the CPU 21. In doing so, the image signal is sent in a wireless manner to the mobile information terminal 46 from the transmitting/receiving circuit 42, and the image is displayed by the display unit 48 of the mobile information terminal 46.

Therefore, with this operation, in the event that monitoring is necessary, by receiving signals from the vehicle in response to the generation of a monitoring command from the mobile information terminal 46, it is possible to easily confirm the state within the automobile or the condition of the surroundings of a parking lot etc. due to it being possible to observe using the mobile information terminal 46.

Figure 10:
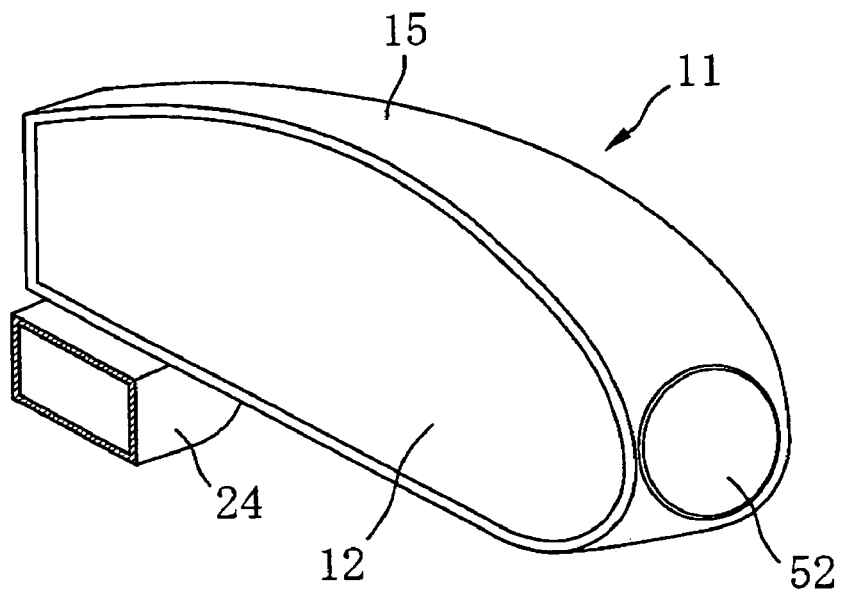
FIG. 10 is a relevant perspective view of a side mirror apparatus of the third embodiment.
Figure 11:
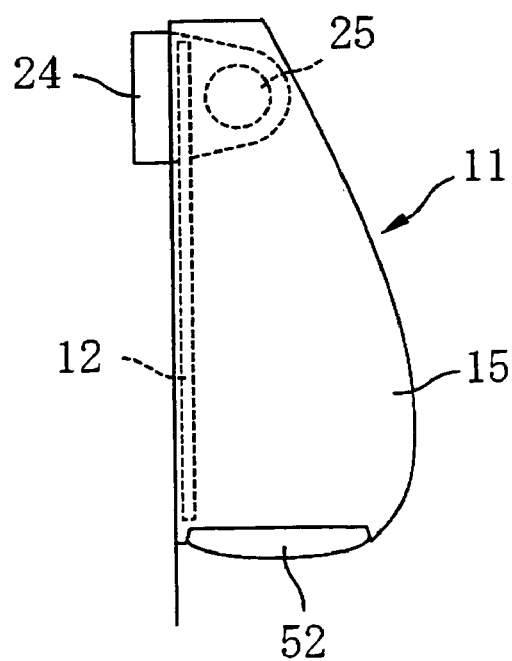
FIG. 11 is a relevant plan view of a side mirror apparatus of the third embodiment.

Next, a description is given of a further embodiment using FIG. 10 and FIG. 11. In either of the above embodiments, an electronic camera employing CCD 17 is installed within the door mirror 11, an image is captured by the electronic camera and is displayed at the display panel 20 or sent to the external mobile information terminal 46. With regards to this, in this embodiment, a second mirror 52 is fitted directly to the outer casing 15 of the door mirror 11.

As in the above, the door mirror 11 is equipped with a variant shaped bowl-type outer casing 15 that is flat, with convex mirror 12 provided on the inside. The convex mirror 12 constitutes a mirror for obtaining a normal field of view to the rear. In this regard, the second mirror 52 is fitted at the end portion of the casing 15. The second mirror 52 may also be a convex mirror.

When the second mirror 52 is fitted to is fitted to the part at the end portion of the outer casing 15, in the event that the door mirror 11 is stored at the stored position as shown in FIG. 11, a field of view to the rear can be obtained by the second mirror 52. Therefore, in the event that the door mirror 11 is stored and the door is opened in order to exit from the automobile, it is possible to obtain a field of view directly to the rear using the second mirror 52, a confirmation operation can be carried out, and the degree of safety can be improved. Further, in the event that it is necessary to travel with the door mirror 11 stored due to an obstacle, it is possible to obtain a field of view to the rear using the second mirror 52, and the degree of safety of travel can be improved.

A description is given of the present invention contained in this application using the embodiments contained in the drawings but the present invention contained in this application is by no means limited to the embodiments described above, and various modifications are possible within the range of the technological concept of the invention of this application. For example, the above embodiments relate to a side-mirror apparatus constituted by door mirror but the invention of this application is by no means limited to the door mirror, and may also be broadly applied to side-mirror apparatus fitted to other members.

INDUSTRIAL APPLICABILITY

The principal part of the present invention of this application is a side-mirror apparatus for automobile drawn out to a drawn-out position in the event of use and stored when not in use, provided, at an outer casing of the side-mirror apparatus, with imaging means for obtaining a field of view in a direction substantially orthogonal to the field of the side-mirror apparatus.

According to this side-mirror apparatus for automobile, it is possible to provide a side-mirror apparatus for automobile providing a high degree of safety where a field of view to the side is obtained when in a drawn out position, and a field of view to the rear is obtained when in a stored position.

A further principal part of the present invention of this application is a side-mirror apparatus for automobile drawn out to a drawn-out position in the event of use and stored when not in use, provided with a first mirror for obtaining a field of view to the rear of the vehicle when in use, and a second mirror provided substantially at an end portion at the outer casing of the side-mirror apparatus.

According to this side-mirror apparatus for automobile, it is possible to obtain a field of view to the rear of a vehicle using a second mirror in the event of storage, it is therefore possible to reliably confirm to the rear even when the side-mirror apparatus is in a storage position, and the degree of safety is improved.

The invention claimed is:

1. A side-mirror apparatus for automobile to be drawn out to a drawn-out position so as to obtain a field of view in a rear direction and to be stored when not in use, the side-mirror apparatus comprising:

imaging means, on an substantial end portion of an outer casing of the side mirror apparatus, for obtaining a field of view in a direction substantially orthogonal to a field of view of the side-mirror apparatus, wherein the imaging means obtains a field of view in a side direction when the side-mirror apparatus is in a drawn-out position and the imaging means obtains a field of view in a rear direction when the side-mirror apparatus is in a stored position, and wherein the imaging means is inactivated after a predetermined amount of time has elapsed after an automobile door is opened.

2. A side-mirror apparatus for automobile to be drawn out to a draw-out position so as to obtain a filed of view in a rear direction and to be stored when not in use, the side-mirror apparatus comprising:

imaging means, on an substantial end portion of an outer casing of the side mirror apparatus, for obtaining a field of view in a direction substantially orthogonal to a field of view of the side-mirror apparatus, wherein the imaging means obtains a field of view in a side direction when the side-mirror apparatus is in a drawn-out position and the imaging means obtains a field of view in a rear direction when the side-mirror apparatus is in a stored position, and wherein a field of view in a rear direction is captured by the imaging means and displayed inside an automobile using display means when a start of an operation of opening a door is detected while the side-mirror apparatus being in a stored position.

3. A side-mirror apparatus for automobile to be drawn out to a draw-out position so as to obtain a field of view in a rear direction and to be stored when not in use, the side-mirror apparatus comprising:

imaging means, on an substantial end portion of an outer casing of the side mirror apparatus, for obtaining a field of view in a direction substantially orthogonal to a field of view of the side-mirror apparatus, wherein the imaging means obtains a field of view in a side direction when the side-mirror apparatus is inn a drawn-out position and the imaging means obtains a field of view in a rear direction when the side-mirror apparatus is in a stored position, and wherein the imaging means captures an image of inside and outside of the automobile and sends the image to a monitor apparatus at a remote position via communication means.

4. A side-mirror apparatus for automobile to be drawn out to a drawn-out position so as to obtain a field of view in a rear direction and to be stored when not in use, the side-mirror apparatus comprising:

imaging means, on an substantial end portion of an outer casing of the side mirror apparatus, for obtaining a field of view in a direction substantially orthogonal to a filed of view of the side-mirror apparatus, wherein the imaging means obtains a field of view in a side direction when the side-mirror apparatus is inn a drawn-out position and the imaging means obtains a field of view in a rear direction when the side-mirror apparatus is in a stored position, and wherein an image of the inside of the automobile is captured and sent the image to a monitor apparatus at a remote position via communication means when the side-mirror apparatus is in a stored position.

5. The side-mirror apparatus for automobile according to claim 2, wherein:

a sensor is provided for detecting an abnormality of the automobile, the imaging means captures an image in conjunction with the sensor detection and, the captured image is transmitted by transmission means.

6. The side-mirror apparatus for automobile according to claim 2, wherein:

the imaging means captures an image in response to a monitoring command signal sent from outside, and the captured image is sent by a transmission means.

7. A side-mirror apparatus for automobile to be drawn out to a draw-out position so as to obtain a field of view in a rear direction and to be stored when not in use, the side-mirror apparatus comprising:

imaging means, on an substantial end portion of an outer casing of the side mirror apparatus, for obtaining a field of view in a direction substantially orthogonal to a field of view of the side-mirror apparatus, wherein the imaging means obtains a field of view in a side direction when the side-mirror apparatus is inn a drawn-out position and the imaging means obtains a field of view in a rear direction when the side-mirror apparatus is in a stored position, and wherein the imaging means captures an image of inside and outside of the automobile and sends the image to a monitor apparatus at a remote position via communication means.

8. A side-mirror apparatus for automobile to be drawn out to a draw-out position so as to obtain a field of view in a rear direction and to be stored when not in use, the side-mirror apparatus comprising:

imaging means, on an substantial end portion of an outer casing of the side mirror apparatus, for obtaining a field of view in a direction substantially orthogonal to a field of view of the side-mirror aooaratus, wherein the imaging means obtains a field of view in a side direction when the side-mirror apparatus is inn a drawn-out position and the imaging means obtains a field of view in a rear direction when the side-mirror apparatus is in a stored position, and wherein an image of the inside of the automobile is captured and sent the image to a monitor apparatus at a remote position via communication means when the side-mirror apparatus is in a stored position.

9. The side-mirror apparatus for automobile according to claim 3, wherein:

a sensor is provided for detecting an abnormality of the automobile, the imaging means captures an image in conjunction with the sensor detection and, the captured image is transmitted by transmission means.

10. The side-mirror apparatus for automobile according to claim 3, wherein:

the imaging means captures an image in response to a monitoring command signal sent from outside, and the captured image is sent by a transmission means.

* * * * *